United States Patent [19]

Armstrong et al.

[11] 4,180,861
[45] Dec. 25, 1979

[54] SELECTIVELY OPERABLE MASK GENERATOR

[75] Inventors: Rolfe D. Armstrong, Escondido; Charles R. Lang, Jr., Woodland Hills, both of Calif.

[73] Assignee: NCR Corporation, Dayton, Ohio

[21] Appl. No.: 892,064

[22] Filed: Mar. 31, 1978

[51] Int. Cl.² .............................................. G06F 7/00
[52] U.S. Cl. ................................................... 364/900
[58] Field of Search ... 364/200 MS File, 900 MS File; 358/261

[56] References Cited

U.S. PATENT DOCUMENTS

| | | | |
|---|---|---|---|
| 3,553,652 | 1/1971 | Hanson | 364/900 |
| 3,906,459 | 9/1975 | Desmonds et al. | 364/900 |
| 4,012,722 | 3/1977 | Gajski et al. | 364/900 |

*Primary Examiner*—Leo H. Boudreau
*Attorney, Agent, or Firm*—J. T. Cavender; Edward Dugas; Stephen F. Jewett

[57] ABSTRACT

A mask generator for use in a digital computer receives input signals defining the beginning and the end addresses of the inhibiting bits of the mask. The mask generator includes decoder circuits for receiving the input signals and a look-ahead carry circuit whose output signals represent the mask.

6 Claims, 13 Drawing Figures

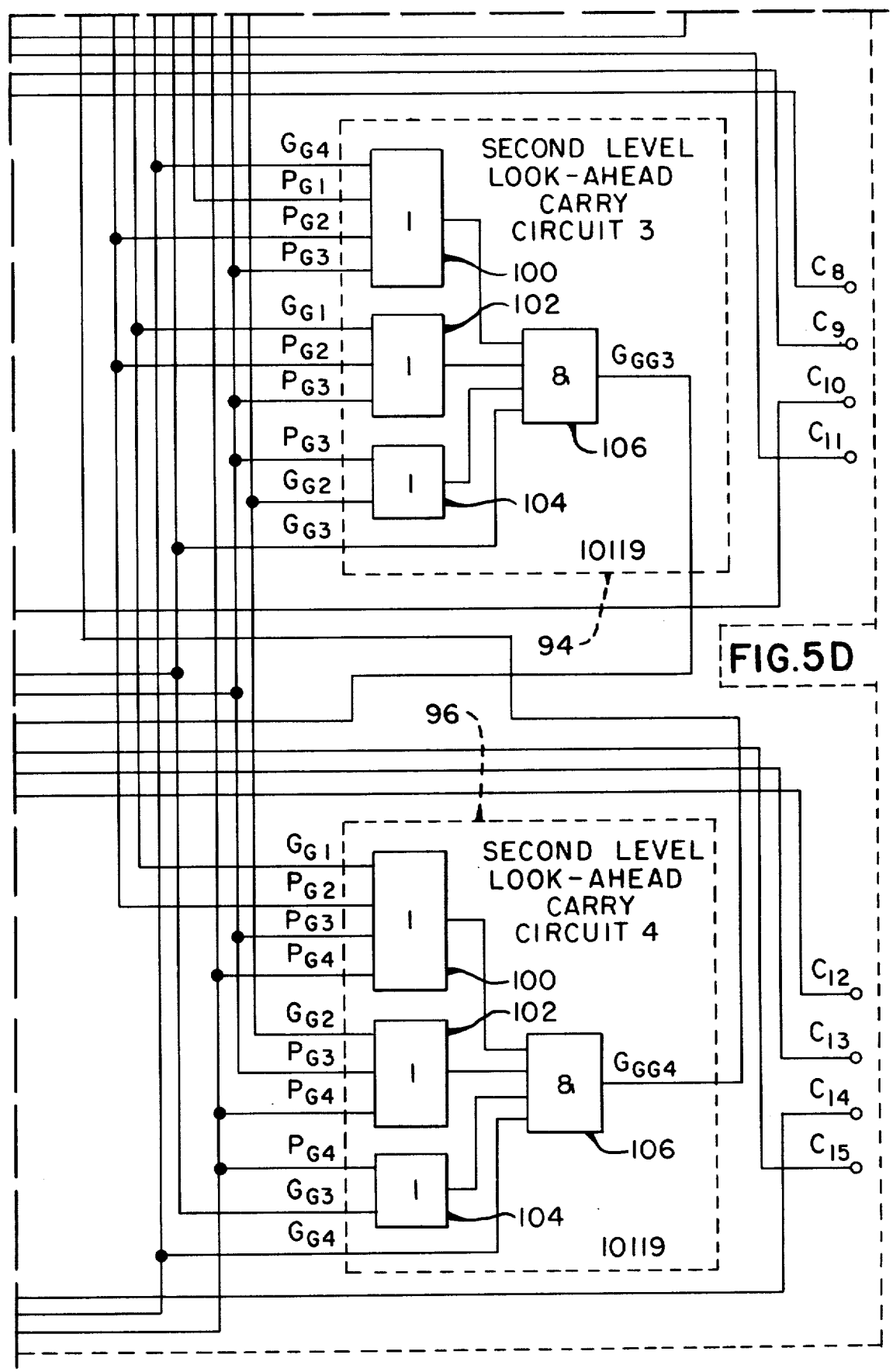

SELECTIVELY OPERABLE MASK GENERATOR

BACKGROUND OF THE INVENTION

The present invention relates to digital computers, and in particular, to a mask generator for use in such computers.

It is common for masks to be used within the processor of digital computers. The masks are used, among other things, for removing or blanking out specified portions of binary micro-instructions or data words before such instructions or words are operated on by the processor. Masks are generally in the form of a binary word having either all logical "0's" or all logical "1's" in the inhibiting bits, i.e., the bits in the mask corresponding to the bits of the instruction or word which are to be removed or blanked out.

In the past, one method for generating masks has been to store a literal, i.e., a binary word having all its bits at a single logic level. A shifter is provided in the computer processor for receiving the literal and shifting the literal either to the left or right so that new bits brought in can be given a different logic level. The literal is shifted so that the new bits are equal in number to the number of bits which are to be masked from the micro-instruction or data word. After the desired number of new bits or inhibiting bits have been created, the modified literal is received by a rotator or multiplexer which rotates or aligns the inhibiting bits so that they appear at the proper location in the modified literal. The modified literal which has been shifted and rotated then becomes the mask and it is stored for used by the processor.

The disadvantage of this method is that it requires several cycles of processor time to shift and rotate the literal, time which could be used for other operations by the processor.

Another method for generating masks is to provide a file of stored masks, with every mask needed by the processor being stored in the file. The difficulty with this type of system is that oftentimes many different masks are needed during the operation of the processor, and that to store each needed mask would require an extremely large storage capacity. Such storage capacity is frequently expensive and would require space which could be used by other parts of the computer.

Still another approach for generating masks is that disclosed in U.S. Pat. No. 4,012,722, entitled "High Speed Modular Mask Generator," issued to Daniel D. Gajski et al. Two masks are used, one of which has logical 1's beginning at a bit location corresponding to the first bit of data to be passed without masking, and the other of which has logical 1's ending at the bit location corresponding to the last bit of data to be passed without masking. The two masks and the data to be masked are inputted to a set of AND gates. Each of two modular mask generators requires control signals for establishing the logic level of the output, in addition to the necessary address signal.

SUMMARY OF THE INVENTION

In accordance with the present invention, a selectively operable mask generator circuit is provided which generates a mask in the form of a binary word having its inhibiting bits at a predetermined binary value and selected by input signals defining the beginning and end inhibiting bits.

In the disclosed embodiments, the mask generator is accomplished by use of look-ahead carry circuits. Look-ahead carry circuits have been known for other purposes in the past, and have inputs for receiving a first set of input signals, designated "generate" signals, and for receiving a second set of input signals, designated "propagate" signals. In the disclosed embodiments, the generate signals determine the address of the beginning inhibiting bit and the propagate signals determine the address of the ending inhibiting bit. The signals or bits produced at the outputs of the look-ahead carry circuits are known as "carries" and correspond in the disclosed embodiments to the bits of the mask generated by the mask generator. Thus, carries having a specific binary value at the output of the look-ahead carry circuit represent the mask, and a succession of bits having a specific binary value at the carry outputs beginning and ending at the bit locations designated by the generate and propagate signals are the inhibiting bits.

In an embodiment using a plurality of commercially available look-ahead carry circuits, second level look-ahead carry circuits are provided. The second level look-ahead carry circuits increase the speed of the commercially available circuits, which have a limited number of inputs and outputs.

The present invention also provides for more than one group of successive inhibiting bits in each mask. This is accomplished, in the case where one group begins at the first bit of the mask and a second group ends at the last bit of the mask, by using a single beginning address signal and a single end address signal. This type of mask generation is referred to as "wrap-around," since the inhibiting bits start within the mask and continue from the end of the mask, back around to the beginning bits of the mask.

It is therefore an object of the present invention to provide an improved mask generator.

It is a further object of the present invention to provide a mask generator having inhibiting bits selected by beginning and end input address signals.

It is still a further object of the present invention to provide a mask generator using a look-ahead carry circuit for generating signals representing the bits of the mask.

It is still a further object of the present invention to provide a mask generator using combined, commercially available look-ahead carry circuits.

Other objects, features and advantages of the invention will be apparent from the following detailed description, as illustrated in the accompanying drawings.

BRIEF DESCRIPTION OF THE DRAWINGS

FIGS. 5A through 5D, taken collectively, are a circuit diagram showing an alternate form of the look-ahead carry circuit illustrated in FIG. 2, constructed from a plurality of commercially-available look-ahead carry circuits.

DESCRIPTION OF THE PREFERRED EMBODIMENT

Figure 1:
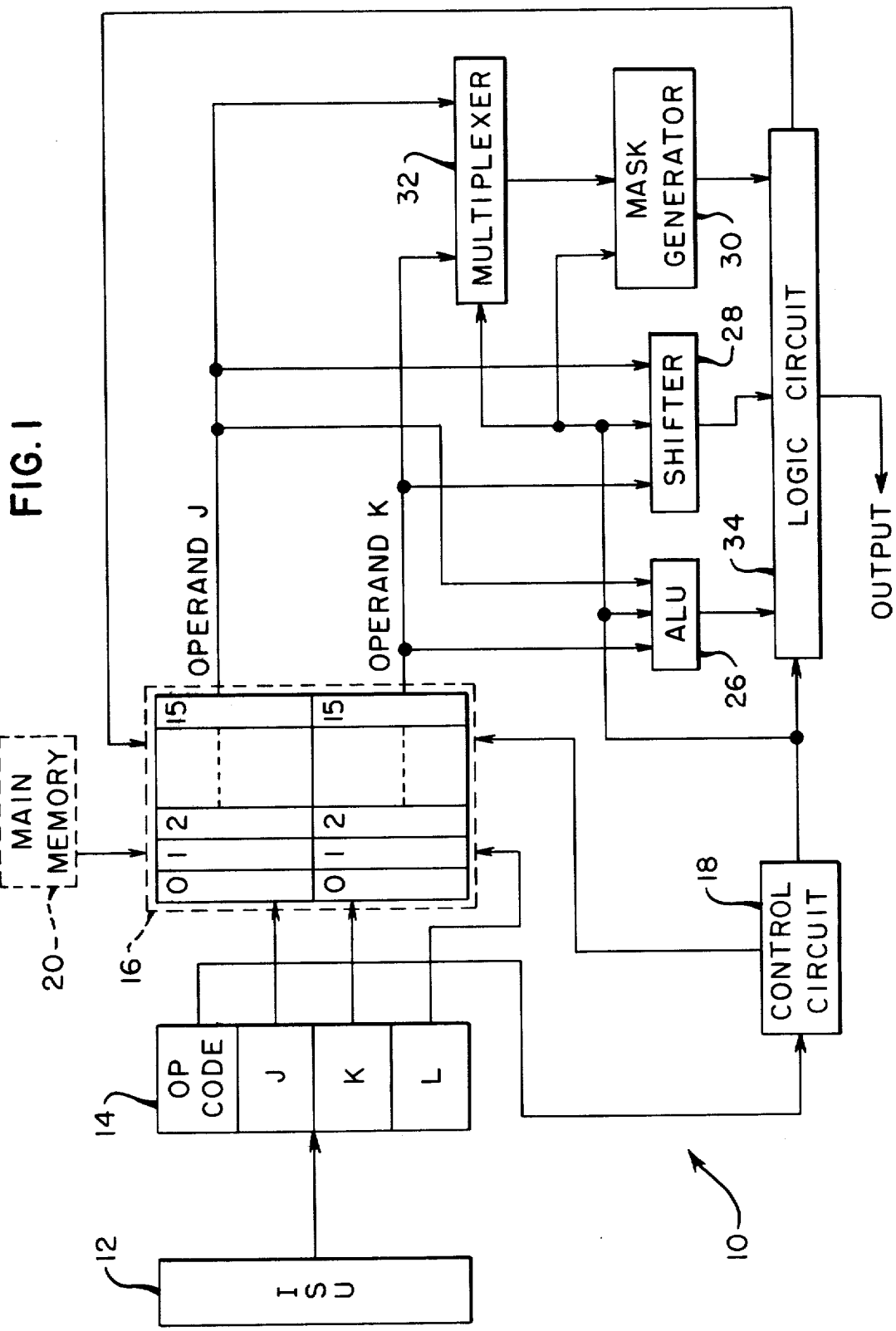
FIG. 1 is a simplified block diagram of a computer processor, including a mask generator made in accordance with the present invention.

Referring now to FIG. 1, there is illustrated in simplified form a processor 10 of a digital computer. The processor 10 includes an instruction storage unit (ISU) 12 which holds all the necessary sets of computer micro-instructions or commands for operating the computer in accordance with an external program. As each micro-instruction is called for within the processor, it is stored in an instruction register 14. The outputs of the instruction register 14 are connected to a scratch pad memory 16 and to a control circuit 18. The scratch pad memory 16 maintains a file of readily accessible data to be operated on in accordance with the micro-instruction held in instruction register 14. Data may be written into the scratch pad memory 16 either from the main memory 20 of the computer or from the circuitry at the output of the processor 10 itself.

Data words fetched from the scratch pad memory 16 by the instruction register 14 are designated as operand J and operand K and are carried to an arithmetic and logic unit (ALU) 26, a shifter circuit 28, or a mask generator circuit 30 by way of a multiplexer circuit 32. The ALU 26 can perform various operations on the operands J and K, such as add, subtract, and various Boolean functions. The shifter 28 shifts or aligns the operands as needed if they have been first masked, and returns them to the scratch pad memory 16 for presentation to the ALU 26. The shifter 28 is a conventional device which can be implemented by a multiplexing circuit, such as the Motorola MC10164 circuit. The multiplexer 32 selectively passes either the operand J or the operand K to the mask generator 30.

The outputs of the ALU 26, shifter 28, and mask generator 30 are connected to a logic circuit 34. The logic circuit 34 is controlled, as is the scratch pad memory 16, ALU 26, shifter 28, mask generator 30 and multiplexer 32, by the control circuit 18, and generally consists of several selectable logic gates for logically combining data or for passing data to the processor output or back to the scratch pad memory 16.

In the operation of the processor 10 illustrated in FIG. 1, the instruction storage unit 12 will periodically deliver micro-instructions to the instruction register 14. Each such micro-instruction comprises, as illustrated in the instruction register 14 of FIG. 1, an operational code (op code) and three descriptors J, K and L. The descriptors J, K and L each represent a data address within the scratch pad memory 16. The scratch pad memory 16 includes, for purposes of illustration in FIG. 1, two sets (an upper set and a lower set) of data addresses, with each set comprising sixteen data addresses, designated 0 through 15, and with the data at each address comprising a word of 16 bits in length. The descriptor J of each micro-instruction comprises a 4-bit code designating one of the sixteen data addresses in the upper set of data in the scratch pad memory 16. The descriptor K comprises a 4-bit code designating one of the sixteen data addresses in the lower set of data in the scratch pad memory. The descriptor L is a 5-bit code designating one of the 32 data addresses in either of the sets of data. The operational code of the micro-instruction is delivered to the control circuit 18 and will "tell" the control circuit the type of operation which is to be performed by the processor.

The control circuit 18 also receives clocking signals from an external clock source, not shown, and in response delivers appropriate control signals to the scratch pad memory 16, ALU 26, shifter 28, mask generator 30 and multiplexer 32.

If data is to be masked before being operated on by the ALU 26, the micro-instruction in instruction register 14 will consist of an operational code indicating to the control circuit 18 that a masking operation is to be performed, that the inhibiting bits of the mask are to begin and end at bits whose addresses are defined by the data within the scratch pad memory at one of the sixteen addresses defined by one of the descriptors J and K, that the mask is to be used for masking a data word at one of the sixteen addresses defined by the other of the descriptors J and K, and that the masked word is to be stored in the scratch pad memory at the address defined by the descriptor L.

To illustrate the above, suppose that the beginning and end addresses for the inhibiting bits of the desired mask are stored in the first 8 bits of the data word stored in the first or "0" address of the upper set of data in scratch pad memory 16, and that the data word to be masked is stored in the first or 37 0" address of the lower set of data. The multiplexer 32 passes the "0" address data in the upper set (operand J) to the mask generator 30, which then generates a mask having inhibiting bits beginning and ending at locations defined by the operand J. The data words to be masked is passed by the ALU 26 to the logic circuit 34, which logically combines the data word and mask. The resulting masked word at the output of logic circuit 34 is returned to the data address in scratch pad memory 16 defined by descriptor L.

The next micro-instruction "tells" the control circuit 18 that the masked word is to be shifted or aligned so that the unmasked portions of the data word appear in the most significant or most leftward positions for presentation to the ALU. After such shifting takes place in the shifter 28, the shifted data word may again be stored in the scratch pad memory 16 for final operation by the ALU with another operand in the scratch pad memory 16. The result of this final operation might again be returned to the scratch pad memory 16 or it might, as determined by the control circuit 18 and logic circuit 34, be delivered to the output of the processor.

Figure 2:
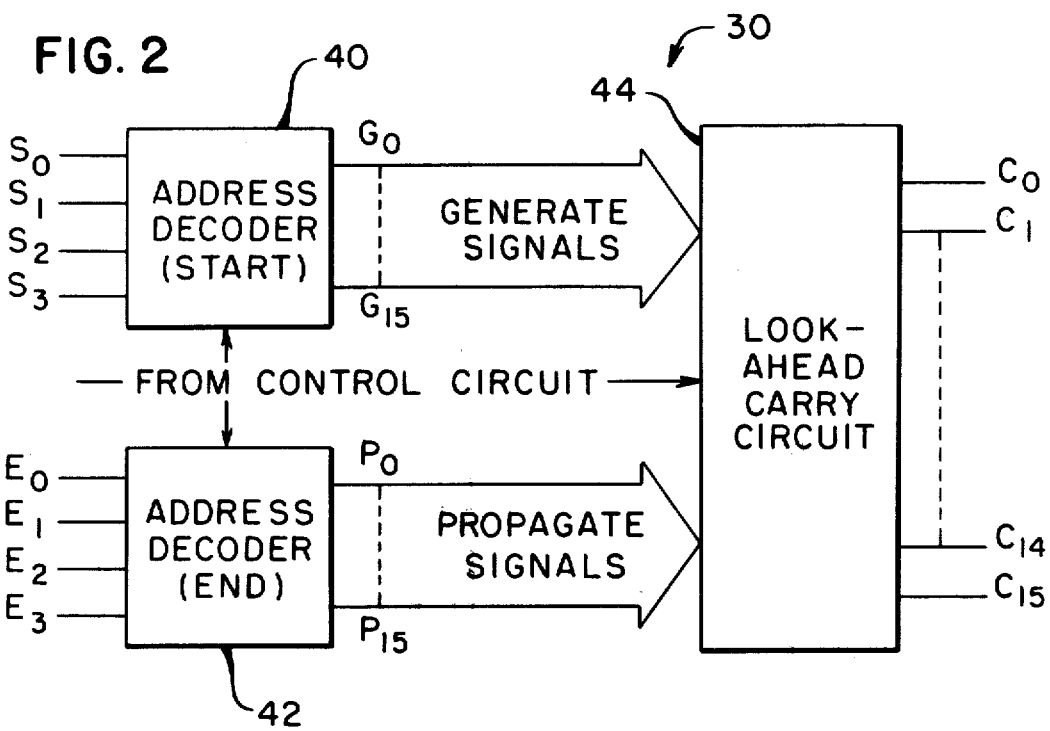
FIG. 2 is a simplified block diagram showing the major components of the mask generator illustrated in FIG. 1.

A more detailed illustration of the mask generator 30, in accordance with the present invention, appears in FIG. 2. As seen in FIG. 2, the mask generator 30 is preferably comprised of an address decoder 40 for decoding the start or beginning address of the inhibiting bits, an address decoder 42 for decoding the end address of the inhibiting bits, and a look-ahead carry circuit 44. The decoders 40 and 42 and look-ahead carry circuit 44 receive, as illustrated only in FIGS. 1 and 2, appropriate control or enabling signals from control circuit 18. The address defining the start or beginning of the inhibiting bits of a mask can be defined by four bits, which are designated $S_0$, $S_1$, $S_2$ and $S_3$ in FIG. 2, and the end address of the inhibiting bits can be defined by four bits, which are designated $E_0$, $E_1$, $E_2$ and $E_3$ in FIG. 2. Each of the address decoders 40 and 42 are circuits well-known to those skilled in the art, such as Motorola MC10161 and MC10162 circuits. The decoders convert the 4-bit coded signals at their inputs into an enabled signal at one of sixteen outputs of the decoders. For the start address decoder 40, the outputs are designated $G_0$ through $G_{15}$ and for the end address decoder 42, the outputs are designated $P_0$ through $P_{15}$. For reasons which will become apparent later in connection with the description of FIGS. 3A and 3B, and FIGS. 4A through 4C, the one enabled signal at the outputs of decoder 40 will be at a 37 1" logic level, and the one enabled signal at outputs of decoder 42 will be at a "0" logic level.

The look-ahead carry circuit 44 is also a circuit well-known in the art. Although in the past it has been generally used for the generation of carries to provide fast results in binary adders, its operation makes it particularly useful in the generation of masks.

The output signals of the look-ahead carry circuit 44, which are also the output of the mask generator, are referred to as "carries," are sixteen in number as noted earlier, and are designated in FIG. 2 as $C_0$ through $C_{15}$. Assuming, for present purposes, that the inhibiting bits of the mask are to be at logic "0," the look-ahead carry circuit 44 will generate logical "1's" at each of the outputs $C_0$ through $C_{15}$ except for the inhibiting bits, i.e., the group of consecutive carries at a logic "0," beginning at the carry whose corresponding generate input signal is enabled at a "1" logic level, and ending at a carry whose corresponding propagate signal immediately precedes the propagate signal which is enabled at a "0" logic level.

Figure 3A:
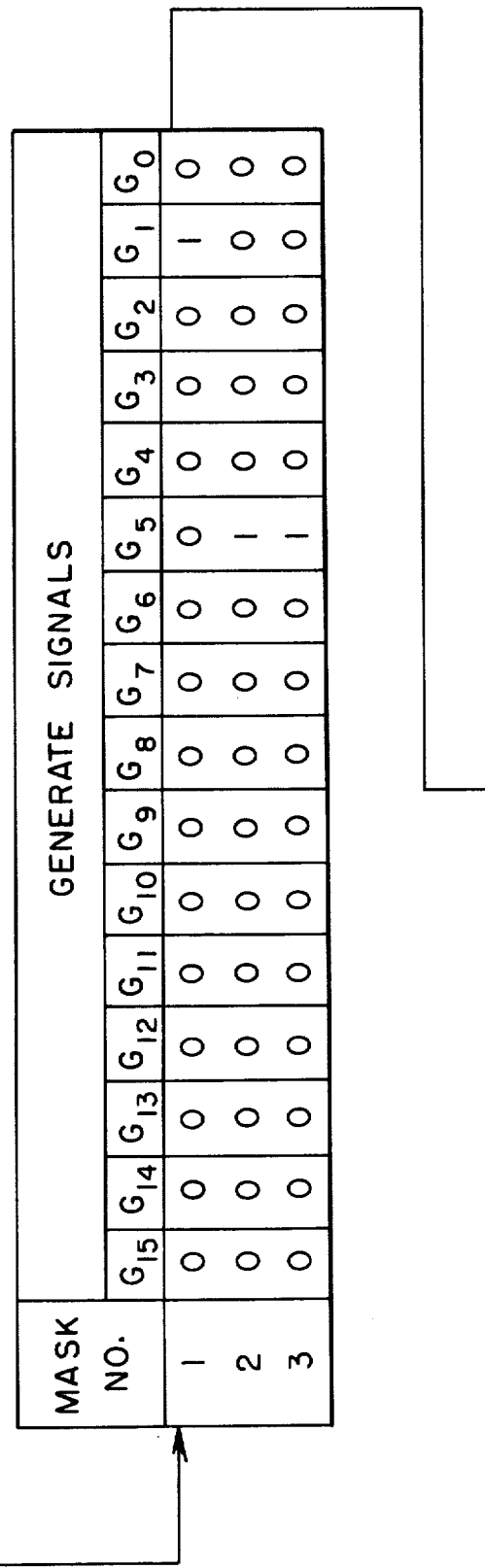
FIGS. 3A and 3B are tables illustrating the input and output signals of the address decoder and look-ahead carry circuit of FIG. 2, in three exemplary cases.
Figure 3B:
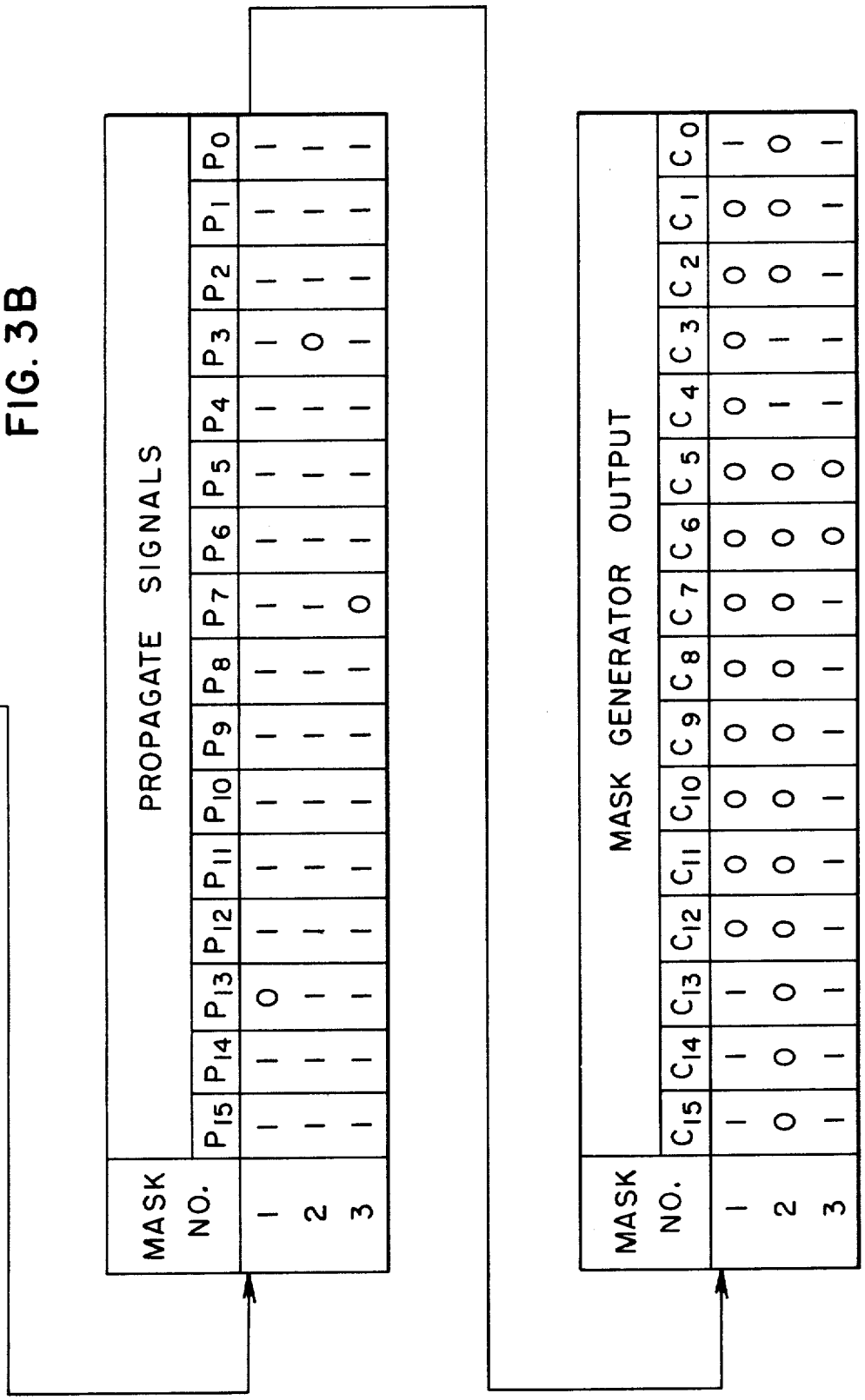

To illustrate the above, reference can be had to the table in FIGS. 3A and 3B where three masks, designated No. 1, No. 2 and No. 3, and the signals which generate such masks are illustrated. In Mask No. 1, the start address decoder 40 receives a coded start address input of 0001 (binary 1) and a coded end address input of 1100 (binary 12). These address inputs indicate that the masking bits of the mask are to begin at $C_1$ and are to end at $C_{12}$. The generate signals delivered to look-ahead carry circuit 44 from decoder 40 will be at a "0" logic level except for $G_1$, which is at a "1" logic level. The propagate signals delivered to the look-ahead carry circuit 44 will be at a "1" logic level, except for $P_{13}$, which will be at a "0" logic level and will cause the mask to end at the preceding carry output, $C_{12}$. The generate and propagate signals delivered to the look-ahead carry circuit will thereby cause the mask to have consecutive inhibiting bits beginning at $C_1$ and ending at $C_{12}$, with such bits being at a "0" logic level, and with the bits elsewhere in the mask being at a "1" logic level.

In Mask No. 2, the coded start address received by the address decoder 40 is 0101 and the coded end address is 0010. Accordingly, $G_5$ is at a "1" logic level and $P_3$ is at a "0" logic level. The "0" logic level inhibiting bits at the output of look-ahead carry circuit 44 will extend from $C_5$ through $C_{15}$ and then include $C_0$ through $C_2$. It can thus be seen that the mask generator can generate inhibiting bits from the beginning inhibiting bit to the end of the mask and continue on from the beginning of the mask to the ending inhibiting bit. This feature, which is called "wrap-around," is a significant advantage of the preferred embodiment in that if all the bits at the beginning and end of a binary word are to be masked, such masking can be accomplished with a single start and end address to the mask generator for the beginning and end of the inhibiting bits.

In Mask No. 3, the coded start address is 0101 and the coded end address is 0110. The mask accordingly begins at $C_5$ and ends at $C_6$.

Figure 4:
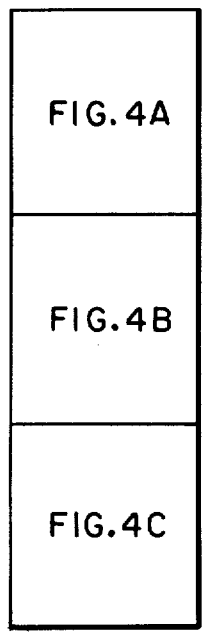
FIG. 4 illustrates the relation of FIGS. 4A through 4C.
Figure 4A:
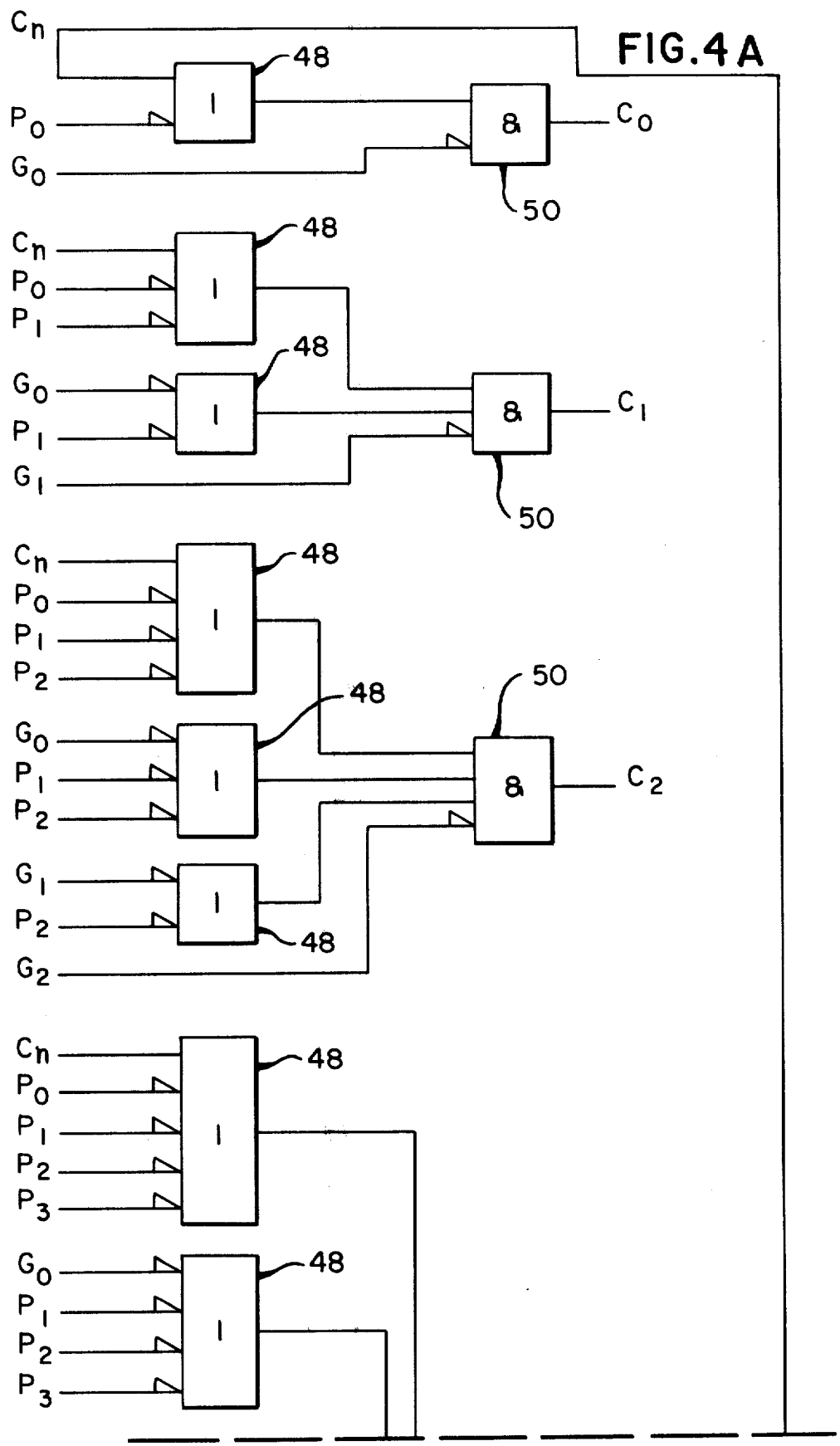
FIGS. 4A through 4C, taken collectively, are a detailed circuit diagram showing in generalized form the look-ahead carry circuit that is illustrated in FIG. 2.
Figure 4B:
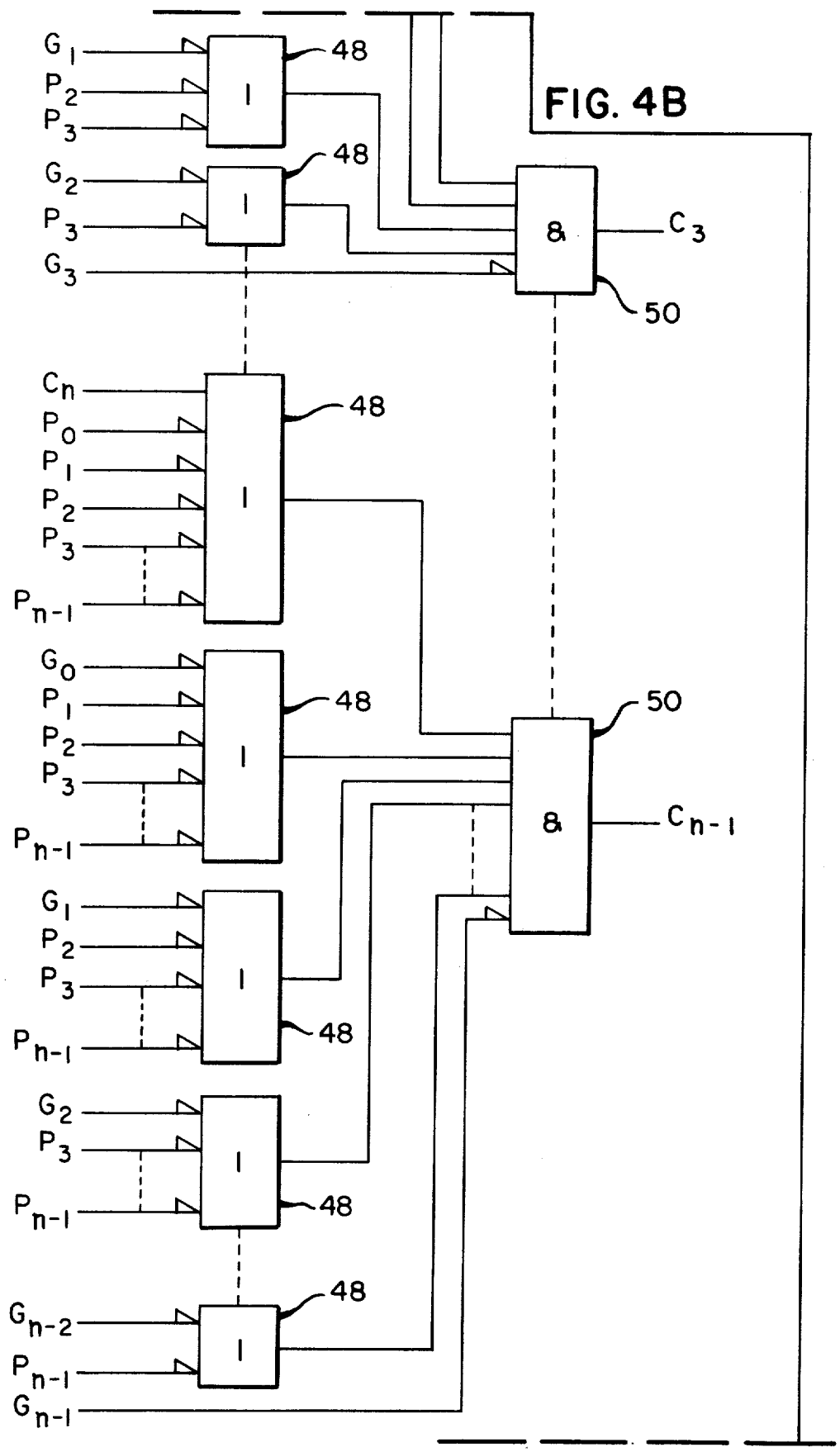
Figure 4C:
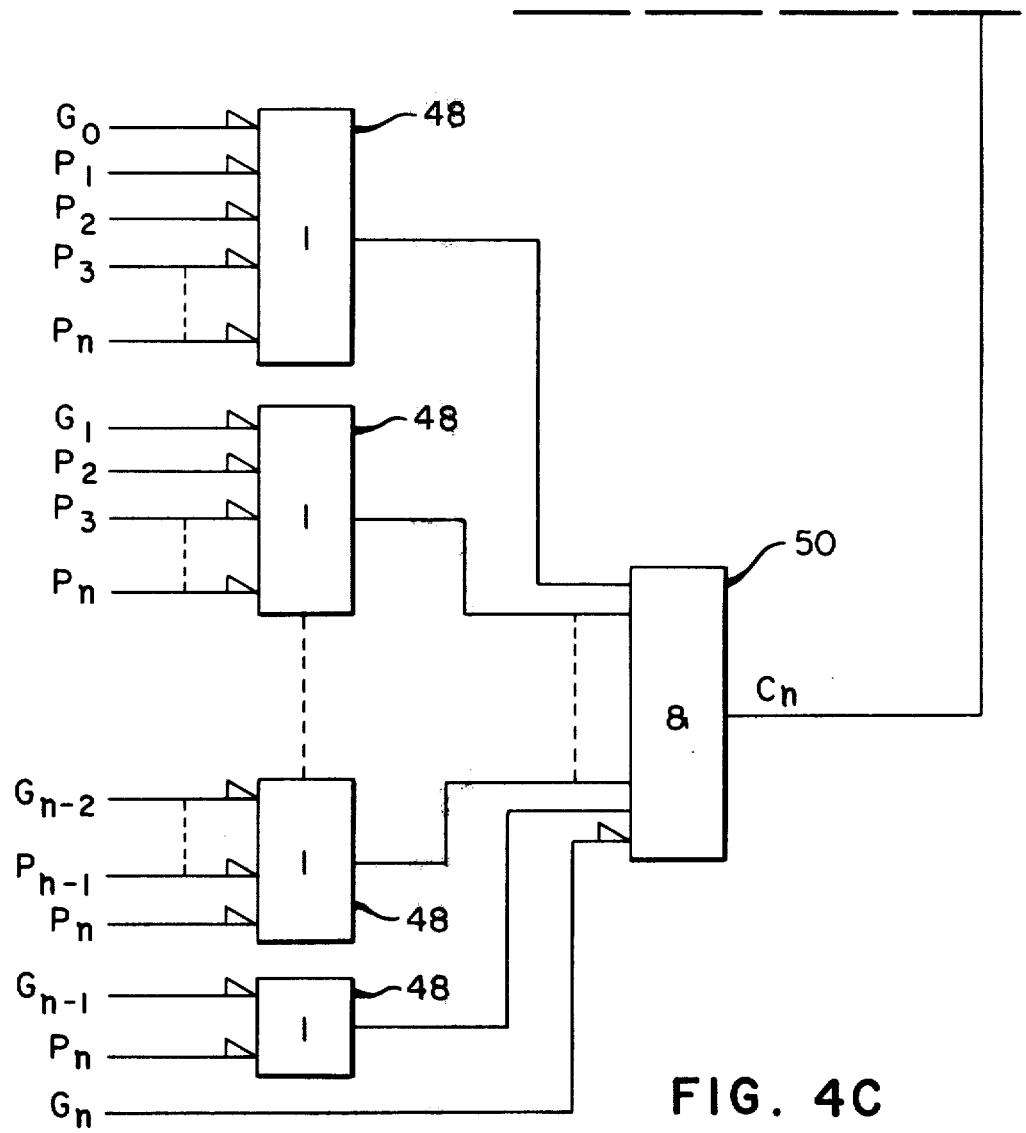

A generalized block diagram showing in detail the circuitry of look-ahead carry circuit 44 is shown in FIGS. 4A through 4C. The diagrammatic relation of FIGS. 4A, 4B and 4C is shown in FIG. 4. Although shown in FIGS. 4A through 4C as having n number of carry outputs, $C_0$ through $C_n$, it should be appreciated that for the mask generator 30 illustrated in FIGS. 1 and 2, only sixteen carry outputs are needed and thus n would equal 16. The carry outputs $C_0$ through $C_n$ are generated by two levels of logic gates, the first level comprising one or more OR gates 48 for each carry output and the second level comprising one AND gate 50 for each carry output. The OR gates 48 associated with any given carry output test for the conditions of an enabled generate signal (logic level "1") being associated with any previous carry output and non-enabled propagate signals (logic level "1") being associated with every carry from the enabled generate signal up to and including the given carry output. The AND gate 50 receives the outputs of the OR gates 48 and also the generate signal for its associated carry, and if any of the previously mentioned conditions are true, an inhibiting carry (logic level "0") is generated at the output of gate 50. For example, at the output $C_0$, inputs are $C_n$, which is the last carry output of the look-ahead carry circuit and which is at a logic "0" if an inhibiting carry has been generated at $C_n$ or propagated from any previous carry output, $P_0$ which indicates whether a carry is to be propagated through to $C_0$, and $G_0$ which indicates whether a carry is to be generated at $C_0$. If $C_n$ is equal to 0 and $P_0$ is equal to 1, or if $G_0$ is equal to 1, the output of AND gate 50, $C_0$, is equal to 0 and a carry is generated at this output indicating an inhibiting bit. The same conditions are tested for with each subsequent carry output with, of course, the number of OR gates 48 increasing since an enabled generate signal must be tested for at each previous carry output.

The fact that all of the carry outputs test for a carry at $C_n$ provides for the previously mentioned feature of "wrap-around." That is, if $C_n$ is equal to 0, indicating that an inhibiting carry has been generated either at the $C_n$ or at one of the carries prior to $C_n$, such inhibiting carries may continue to be propagated to $C_0$ and from there until reaching the carry output which has an associated propagate signal that is enabled (at a "0" logic level). This condition is illustrated by Mask No. 2 in FIGS. 3A and 3B. It should be noted that the portion of the circuit associated with the carry output $C_n$ (seen in FIG. 4C) is the only portion of the circuit that does not also have a $C_n$ input at the gates 48.

Figure 5:
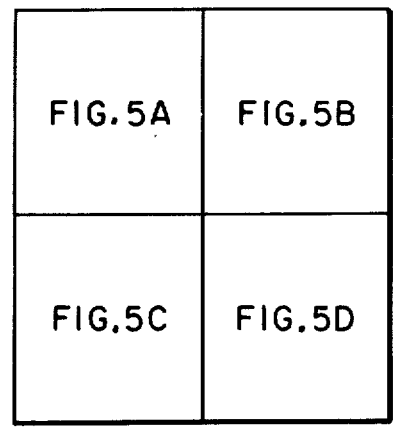
FIG. 5 illustrates the relation of FIGS. 5A through 5D.

As noted earlier, look-ahead carry circuits are well-known in the art. Commercially available look-ahead carry circuits are, however, generally designed for generating only four carriers or carry outputs. Since for most computer processors the required masks would normally have more than four bits, it is necessary to combine several of the commercially available circuits. A look-ahead carry circuit 44', using multiple commercially available circuits, is illustrated in FIGS. 5A through 5D. The diagrammatic relation of FIGS. 5A, 5B, 5C and 5D is illustrated in FIG. 5.

Although it would be possible to merely connect the last carry output of each commercially available circuit to the carry input ($C_{in}$) of the next commercially available circuit in order to arrive at the desired number of carry outputs (16 in the described embodiment), such an arrangement would result in considerable delay before all of the carry outputs are generated. Such a delay is one of the significant problems of the prior art which the present invention overcomes, and accordingly, the look-ahead carry circuit 44' shown in FIGS. 5A through 5D has been designed to minimize these delays when using multiple, commercially-available look-ahead carry circuits.

It should be noted that the generate and propagate signals are inverted in FIGS. 5A through 5D. This is illustrated by a "bar" or line over the indicated signals, and, as opposed to earlier figures, an enabled generate signal is at a "0" level and an enabled propagate signal is at a "1" level.

The minimization of delays in the use of commercially-available circuits is accomplished by implementing first level look-ahead carry circuits and second level look-ahead carry circuits to generate the sixteen carries in a mask generator. The first level look-ahead carry circuits, designated 60, 62, 64 and 66 in FIGS. 5A and 5C, may be Motorola MC10179 circuits. Each of the circuits 60, 62, 64 and 66 have, as shown, inputs for receiving four generate and four propagate signals, a carry input ($C_{in}$) two carry outputs $C_{in+2}$ and $C_{in+4}$ and two additional outputs $G_G$ and $P_G$. A group generate signal at the $G_G$ output of each circuit is at a "0" when an inhibiting carry bit has been generated within that circuit (any inverted generate signal enabled at a "0") and propagated through that circuit (all following inverted propagate signals not enabled, thus at a "0"). A group propagate signal at the $P_G$ output of each circuit is at a "0" when a carry can be propagated through that circuit (when all of the inverted propagate signals are not enabled, and thus at a "0" logic level).

The commercially-available first level circuits 60, 62, 64 and 66 have only two carry outputs for purposes of packaging convenience, and it is therefore necessary to include supplemental circuits 70, 72, 74 and 76, each generating the remaining two carry output signals for their associated first and second level look-ahead carry circuits. Each of the supplemental circuits 70, 72, 74 and 76 include two OR gates 80 and 82, and two AND gates, 84 and 86. The supplemental circuits may be commercially-available circuits, such as Motorola MC10117 circuits.

Figure 5A:
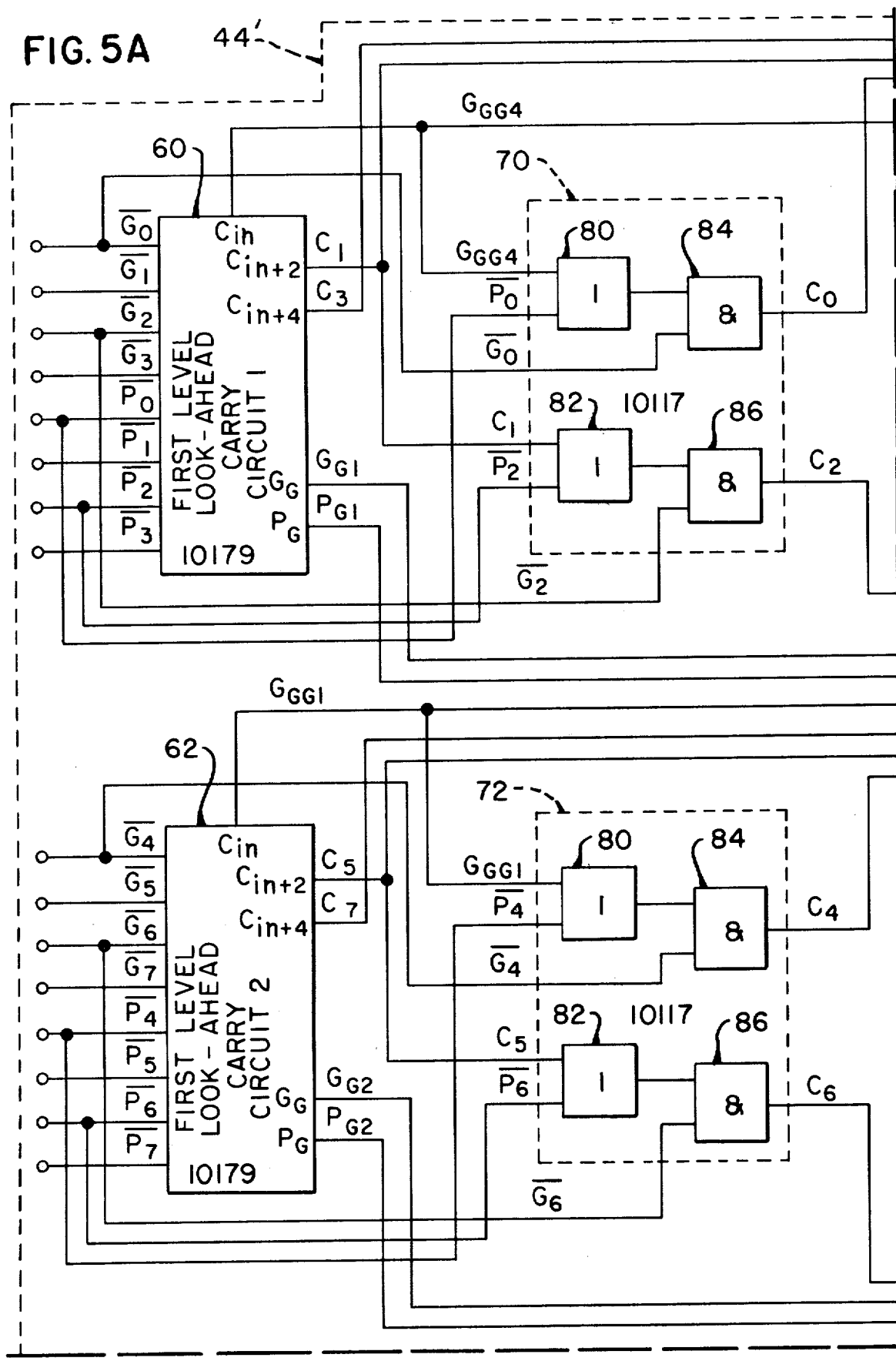
Figure 5B:
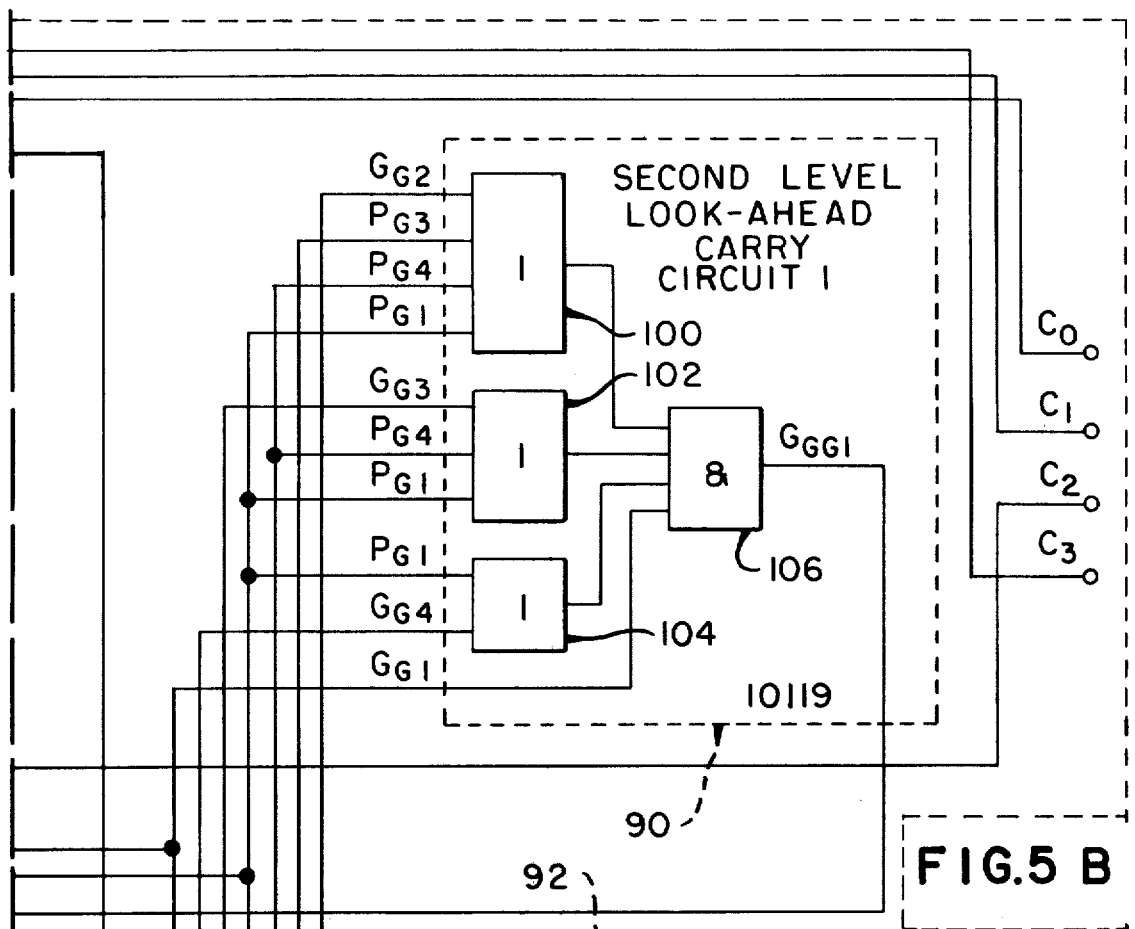
Figure 5B:
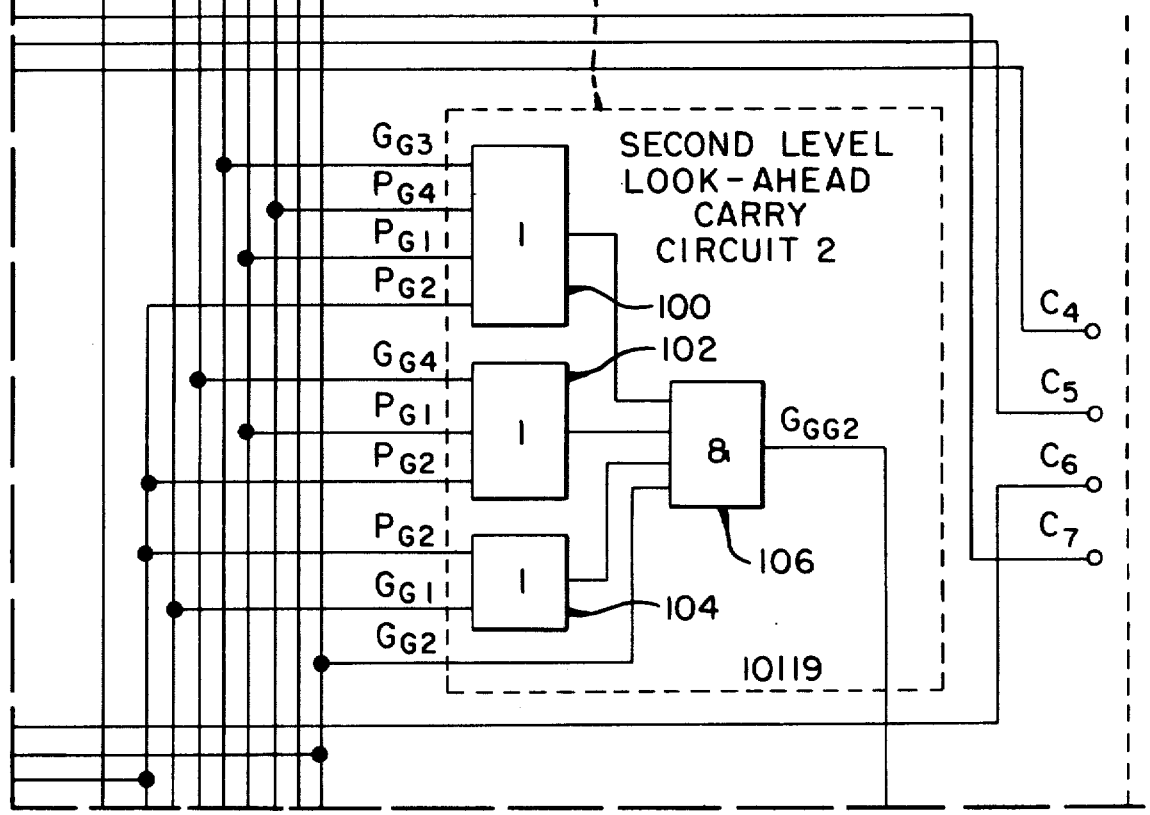
Figure 5C:
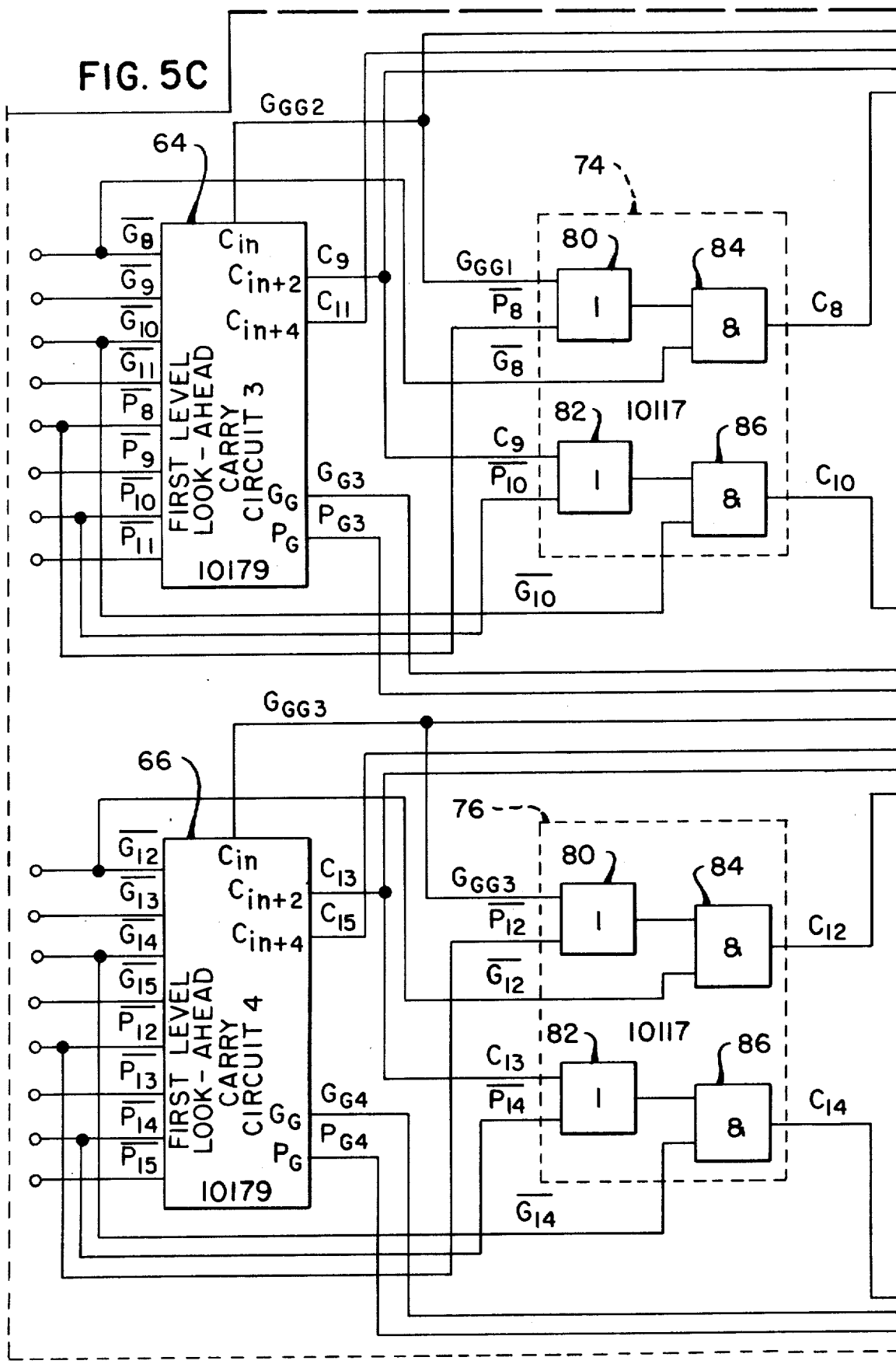

The second level look-ahead carry circuits in circuit 44' are designated 90, 92, 94, and 96 and may be commercially available circuits, such as Motorola MC10119 circuits. As seen in FIGS. 5B and 5D, each of the second level circuits is comprised of three OR gates 100, 102 and 104 and an AND gate 106. The outputs $G_{GG1}$, $G_{GG2}$, and $G_{GG3}$ of the second level circuits 90, 92 and 94 are each connected to the $C_{in}$ input of the next first level circuit and to its associated supplemental circuit; the output $G_{GG4}$ of second level circuit 96 is connected to the $C_{in}$ input of the first level circuit 60 and to the supplemental carry circuit 70.

Turning now to the operation of the look-ahead carry circuit 44' of FIGS. 5A through 5D, the $\overline{G_0}$ through $\overline{G_{15}}$ and $\overline{P_0}$ through $\overline{P_{15}}$ signals are first applied to the inputs of the first level look-ahead carry circuits 60, 62, 64 and 66. The resulting $G_{G1}$ through $G_{G4}$ and $P_{G1}$ through $P_{G4}$ signals at the outputs of the first level circuits are provided to the second level look-ahead carry circuits 90, 92, 94 and 96. The output of each of the second level circuits, $G_{GG1}$, $G_{GG2}$, $G_{GG3}$ and $G_{GG4}$ indicates whether a carry has been generated within its associated first level circuit and propagated therethrough, or whether a carry has been generated in any previous first level circuit and has been propagated through its associated first level circuit.

For example, looking at second level circuit 90, the OR gate 100 receives as input signals $G_{G2}$, $P_{G3}$, $P_{G4}$ and $P_{G1}$. If a carry has been generated in first level circuit 62 and propagated from first level circuit 62 ($G_{G2}$ at "0") and through first level circuits 64, 66 and 60 ($P_{G3}$, $P_{G4}$ and $P_{G1}$ at "0"), the output of OR gate 100 and AND gate 106, and hence the output $G_{GG1}$, will be at a "0." Similarly, the OR gate 102 receives the $G_{G3}$, $P_{G4}$ and $P_{G1}$ signals, and if a carry has been generated in first level circuit 64 and propagated from first level circuit 64 ($G_{G3}$ at "0") and through first level circuits 66 and 60 ($P_{G4}$ and $P_{G1}$ at "0"), the output of OR gate 102 and AND gate 106 will be at a "0." The OR gate 104 receives the $P_{G1}$ and $G_{G4}$ signals, and if a carry has been generated in first level circuit 66 and propagated from first level circuit 66 ($G_{G4}$ at "0") and such carry is propagated through first level circuit 60 ($P_{G1}$ at "0"), the output of OR gate 104 and AND gate 106 will be at "0." The final input to AND gate 106 is $G_{G1}$, and if a carry has been generated in and propagated from first level circuit 60 ($G_{G1}$ at "0"), the output of AND gate 106 will be at a "0."

The gates 100, 102, 104 and 106 in the remaining second level circuits 92, 94, and 96 test for similar conditions. That is, the output of each of the second level circuits 92, 94 and 96 goes to a "0" if a carry has been generated in any of the first level circuits and has been propagated through the second level circuit's associated first level circuit.

Turning now to the supplemental circuits 70, 72, 74 and 76, as noted before each supplemental circuit generates two carries not otherwise generated by the first level circuits. Each supplemental circuit receives the output of the preceding second level circuit, the signal from its associated first level circuit at the $C_{in+2}$ output, and the first and third propagate and generate signals at the inputs of its associated first level circuit. For example, referring to the supplemental circuit 70, the OR gate 80 receives the $G_{GG4}$ and $\overline{P_0}$ signals. The output of OR gate 80 and the $\overline{G_0}$ signal are applied to the inputs of the AND gate 84. The output of AND gate 84, $C_0$, thus goes to "0" if both $G_{GG4}$ and $\overline{P_0}$ are at "0", or if $\overline{G_0}$ is at "0." The OR gate 82 receives the $C_1$ and $\overline{P_2}$ signals. The output of OR gate 82 goes to AND gate 86 along with the $\overline{G_2}$ signal, and the output of gate 86, $C_2$, goes to "0" if both $C_1$ and $\overline{P_2}$ go to 0, or if $\overline{G_2}$ goes to 0. The $C_4$, $C_6$, $C_8$, $C_{10}$, $C_{12}$ and $C_{14}$ carry signals are generated by the supplemental circuits 72, 74 and 76 in the same fashion.

It can thus be seen that the look-ahead carry circuit 44' of FIGS. 5A through 5D provides the sixteen carries $C_0$ through $C_{15}$ using commercially-available circuits. Although the time taken to generate the carries is not as short as is the case in the generalized look-ahead carry circuit 44 illustrated in FIG. 3, the carries are generated in approximately three cycles of time, i.e., the amount of time it takes the signals to pass through the first level circuits, the second level circuits, and then the supplemental circuits.

Although the presently preferred embodiments have been described, it should be understood that various changes may be made within the purview of the appended claims.

What is claimed is:

1. A mask generator for generating a mask having a plurality of bits at the mask generator output and having a selective number of inhibiting bits of a predetermined value in said plurality of output bits, comprising:

decoder means for receiving a first set of address signals representing the beginning inhibiting bit of the mask and for receiving a second set of address signals representing the address of the end inhibiting bit of the mask, and for converting said first and second set of address signals to a generate signal corresponding to each of said output bits, including an enabled generate signal, and to a propagate signal corresponding to each of said output bits, including an enabled propagate signal; and look-ahead carry circuit means for receiving said generate and propagate signals and for producing said output bits, said outputs bits including said inhibiting bits beginning with an inhibiting bit corresponding to said enabled generate signal and continuing up to an inhibiting bit corresponding to said enabled propagate signal, said look-ahead carry circuit means including:

first gate means associated with each one of said output bits for receiving the generate signal corresponding to each of any output bits preceding its associated one of said output bits and for receiving the propagate signal corresponding to each of any output bits preceding its associated one of said output bits and the propagate signal corresponding to its associated one of said output bits; and second gate means associated with each one of said output bits for receiving the output of the first gate means associated with its associated one of said output bits and the generate signal corresponding to its associated one of said output bits.

2. The mask generator of claim 1 wherein said first gate means includes a number of logic gates increasing in magnitude in relation to the number of preceding output bits.

3. The mask generator of claim 1 wherein the last output bit in said plurality of output bits is connected to the first gate means associated with each of the other output bits in said plurality of output bits.

4. A mask generator for generating a mask having a plurality of bits at the mask generator output and having a selective number of inhibiting bits of a predetermined value in said plurality of output bits, comprising:

decoder means for receiving a first set of address signals representing the beginning inhibiting bit of the mask and for receiving a second set of address signals representing the address of the end inhibiting bit of the mask, and for converting said first and second set of address signals to a generate signal corresponding to each of said outputs, including an enabled generate signal, and to a propagate signal corresponding to each of said output bits, including an enabled propagate signal; and look-ahead carry circuit means for receiving said generate and propagate signals, and for producing said output bits, said output bits including said inhibiting bits beginning with an inhibiting bit corresponding to said enabled generate signal and continuing up to an inhibiting bit corresponding to said enabled propagate signal, said look-ahead carry circuit means including:

a plurality of first level look-ahead carry circuits for generating said plurality of output bits; and a second level look-ahead carry circuit associated with each of said first level circuits for providing a second level output signal to the next following first level circuit, said second level output signal indicating if an inhibiting bit has either been both generated in and propagated through its associated first level circuit, or has been propagated through its associated first level circuit.

5. The mask generator of claim 4, wherein each one of said first level look-ahead carry circuits generates a group generate signal indicating if that one of said first level circuits has received said enabled generate signal and not said enabled propagate signal and a group propagate signal indicating if that one of said first level circuits has not received said enabled propagate signal, and wherein the output of each first level circuit is connected to the input of each second level circuit so that the group generate signal of each first level circuit is received by the second level circuit associated with every other first level circuit, and so that the group propagate signal of each first level circuit is received by every second level circuit.

6. In a computer processor, a mask generator for generating a plurality of output bits, with a preselected group of consecutive inhibiting bits in said output bits, comprising:

a first decoder circuit for receiving a first address signal representing a beginning inhibiting bit and producing a plurality of generate signals in response to said first address signal, one generate signal corresponding to each of said output bits, with the generate signal corresponding to said beginning inhibiting bit being in an enabled condition and the other generate signals being in a non-enabled condition;

a second decoder circuit for receiving a second address signal representing the end inhibiting bit and producing a plurality of propagate signals in response to said second address signal, one propagate signal corresponding to each of said output bits, with the propagate signal following the propagate signal corresponding to said end inhibiting bit being in an enabled condition and the other propagate signals being in a non-enabled condition; and look-ahead carry circuit means for receiving said generate and propagate signals and fixing said inhibiting bits at a predetermined logic level, said look-ahead carry circuit means including first and second logic gate means associated with each output bit; said first gate means for each associated output bit receiving the generate signals corresponding to any preceding output bits and the propagate signals corresponding to any preceding output bits and the propagate signal corresponding to the output bit associated with said first gate means, and said first gate means associated with each output bit except the last output bit also receiving the signal at the last output bit; and said second gate means for each associated output bit receiving the output of said first gate means and the generate signal corresponding to the output bit associated with said second gate means.

* * * * *